US012721353B1

(12) United States Patent
Townsend et al.

(10) Patent No.: US 12,721,353 B1
(45) Date of Patent: Sep. 1, 2026

(54) SYSTEM AND METHOD FOR DETECTING INK MARKING AND EJECTING CARCASS FROM LINE

(71) Applicant: Triumph Foods, LLC, St. Joseph, MO (US)

(72) Inventors: Luke Townsend, King City, MO (US); Jeremy McFarlane, Clarksdale, MO (US); Matthew England, Kansas City, MO (US); Kenneth Grannas, III, St. Joseph, MO (US); Nicholas Huffman, Helena, MO (US); Emily Arkfeld, St. Joseph, MO (US)

(73) Assignee: TRIUMPH FOODS, LLC, St. Joseph, MO (US)

( * ) Notice: Subject to any disclaimer, the term of this patent is extended or adjusted under 35 U.S.C. 154(b) by 0 days.

(21) Appl. No.: 19/322,342

(22) Filed: Sep. 8, 2025

(51) Int. Cl.
*A22C 17/00* (2006.01)
*B07C 5/342* (2006.01)

(52) U.S. Cl.
CPC .......... *A22C 17/008* (2013.01); *B07C 5/3422* (2013.01); *B07C 2501/0081* (2013.01)

(58) Field of Classification Search
CPC ........ A22C 17/008; G06T 7/00; G06V 10/40; G06V 20/56; B07C 5/34; B07C 5/32; B07C 5/3422
USPC .......................................................... 209/580
See application file for complete search history.

(56) References Cited

U.S. PATENT DOCUMENTS

| | | | | |
|---|---|---|---|---|
| 5,194,036 | A * | 3/1993 | Chevalier | G01N 33/12 209/3.3 |
| 5,694,228 | A * | 12/1997 | Peairs | H04N 1/4097 358/448 |
| 9,014,434 | B2 | 4/2015 | Bajema et al. | |
| 10,285,408 | B2 | 5/2019 | Schimitzek | |
| 11,337,432 | B1 | 5/2022 | Tao et al. | |
| 2002/0067797 | A1* | 6/2002 | Safai | A22C 17/10 378/54 |
| 2003/0072472 | A1* | 4/2003 | Haagensen | A22B 5/007 382/110 |
| 2011/0117025 | A1* | 5/2011 | Dacosta | A61B 5/0059 435/5 |
| 2014/0147015 | A1 | 5/2014 | Bajema et al. | |
| 2016/0327538 | A1* | 11/2016 | La Valle Sansone | G01N 31/22 |

(Continued)

FOREIGN PATENT DOCUMENTS

| | | | | |
|---|---|---|---|---|
| CA | 2111937 C | * | 6/2000 | G06T 7/41 |
| CN | 114885973 A | * | 8/2022 | B41J 3/407 |

(Continued)

*Primary Examiner* — Terrell H Matthews
(74) *Attorney, Agent, or Firm* — Husch Blackwell LLP

(57) ABSTRACT

The disclosure relates to methods and systems for identifying ink on an animal carcass, or a portion thereof, using an ink detection model. In one embodiment, the methods and systems disclosed herein use automated methods to determine an objective evaluation of an animal carcass, or a portion thereof, based on the presence or absence of ink on the animal carcass, or a portion thereof. Methods and systems disclosed herein comprise processing one or more images of the animal carcass, or a portion thereof, captured with one or more data capture devices, and using the ink detection model to determine whether the carcass is marked with ink or not.

20 Claims, 7 Drawing Sheets
(2 of 7 Drawing Sheet(s) Filed in Color)

(56) References Cited

U.S. PATENT DOCUMENTS

| | | | | |
|---|---|---|---|---|
| 2017/0236281 | A1* | 8/2017 | Dacosta | G06T 7/0016 382/128 |
| 2019/0000094 | A1 | 1/2019 | Hjalmarsson et al. | |
| 2019/0313654 | A1 | 10/2019 | Healey et al. | |
| 2020/0055678 | A1 | 2/2020 | Shaw et al. | |
| 2021/0035276 | A1 | 2/2021 | Ago et al. | |
| 2021/0121922 | A1 | 4/2021 | Schmidt et al. | |
| 2022/0058571 | A1 | 2/2022 | Edwards et al. | |
| 2022/0095631 | A1 | 3/2022 | Anders | |
| 2023/0214982 | A1 | 7/2023 | Michel et al. | |
| 2023/0316481 | A1* | 10/2023 | Ngadi | G06T 7/136 382/110 |

FOREIGN PATENT DOCUMENTS

| | | | | |
|---|---|---|---|---|
| DE | 10054295 | A1 * | 5/2002 | G01N 33/12 |
| JP | 2023044192 | A | 3/2023 | |
| KR | 102565570 | B1 * | 8/2023 | A23L 13/74 |
| NZ | 334675 | A * | 5/2000 | A22B 5/007 |
| RU | 2728231 | C1 * | 7/2020 | A22B 5/007 |
| WO | WO-2005099460 | A1 * | 10/2005 | A22B 5/0064 |
| WO | WO-2022066736 | A1 * | 3/2022 | G06N 3/045 |

* cited by examiner

NOT INK MARKED

INK MARKED

SYSTEM AND METHOD FOR DETECTING INK MARKING AND EJECTING CARCASS FROM LINE

CROSS-REFERENCE TO RELATED APPLICATIONS

None.

TECHNICAL FIELD

The field of the present invention relates generally to systems and methods for identifying one or more features on an individual animal carcass. In particular, the present invention is directed to a system and method for identifying animal carcasses, or portions thereof, marked with ink and removing the marked carcasses from a processing line.

BACKGROUND OF THE INVENTION

The meat processing industry has an interest in preventing the spread of contamination and maintaining food safety. In some cases, animal carcasses, portions thereof, and/or heads of animal carcasses may be inked to identify a particular carcass as having specific risk factors related to contamination or other defects. Inked carcasses and/or heads are removed from the population of edible/acceptable carcasses and/or heads prior to processing, to not only to minimize cross-contamination but also to mitigate wasted processing resources.

Conventional systems, particularly those in the pork processing industry, identify and remove inked carcasses manually. Since this process is typically performed by individuals, this means that the evaluation results are highly subjective, inconsistent, can take significant time, and utilize costly resources like trained laborers.

Accordingly, a need exists for an automated, objective, efficient, and accurate identification and ejection system and method to identify and remove an inked carcass or head from a processing line. A further need exists for the ability to not only evaluate animal carcasses and/or heads at a speed suitable for a large pork processing facility, but also to provide an objective automated evaluation system that provides effective, accurate, and consistent assessment, identification, and removal of the inked carcasses.

BRIEF SUMMARY OF THE INVENTION

The present invention is directed generally to systems and methods for identifying and removing an inked carcass before the carcass enters further fabrication processes. The system can be provided in the form of an advanced ink detection system designed to determine a presence or absence of ink on a carcass, or a portion thereof, using an advanced ink detection training model, and trigger removal of the inked carcass prior to processing.

One aspect of the present invention is directed to a detection system configured to detect ink or other color marker on an animal carcass. The system may include a transport system, a data capture device, and an ink or color marker detection model. The transport system is designed to move the animal carcass through a meat processing facility and may include a first section and a second section. The data capture device can be designed to capture one or more images of the animal carcass as it moves on the transport system. In one embodiment, the data capture device comprises an RGB camera; however, other suitable image and data capture devices are within the scope of the present invention. The detection model may include or be in communication with at least one processor and a memory unit with programmable instructions that when executed cause at least one processor to: receive an image of one or more images received from the data capture device; isolate a plurality of pixels of the image that are within a specified color range; count a number of pixels that are within the specified color range; divide the number of pixels that are within the specified color range from the number of pixels in the image to get a ratio of colored pixels within the specified color range; determine if the ratio of colored pixels within the specified color range is greater than a threshold value; and/or activate a controller in communication with a processing unit configured to remove the animal carcass when the ratio of colored pixels is greater than the threshold value. The animal carcass may be identified as being marked when the ratio of colored pixels within the specified color range is greater than the threshold value. In one embodiment, the detection model is also designed to identify a color value, wherein the specified color range corresponds to the color value. The detection model may also cause the processor to convert the image to a color format prior to isolating the plurality of pixels and optionally save the image associated with a marked animal carcass to the memory unit. The step of isolating the plurality of pixels can include creating a mask of any pixel value that is between an upper color format value and a lower color format value selected as the specified color range and applying the mask over the image. The output from the detection model can be transmitted to a controller. The controller may execute instructions to an ejection device based on the output it receives from the detection model. When ink or other color marker is identified on the carcass, the ejection device removes the carcass. In one embodiment, the ejection device removes the carcass from a first section of the transport system onto a second section of the transport system.

Another aspect of the present invention is directed to a method for identifying an animal carcass marked with ink or other color marker using an ink or color detection model. The method may comprise a number of steps including: transporting the carcass using a transport system; triggering a data capture device as the carcass moves on the transport system; processing one or more images of the carcass captured by the data capture device using at least one processor of the ink detection model; determining an objective evaluation of the carcass by identifying a presence or absence of the ink on the carcass; activating a controller in communication with a processing unit configured to remove the carcass when the presence of the ink or color marker is identified on the carcass; and/or generating a notification using a notification system, wherein the notification can include an output of the detection model. The step of processing the image of the carcass can include: converting the image to a color format; and isolating a plurality of pixels of the image by creating a mask of any pixel value that is between an upper color format value and a lower color format value selected as a specified color range and applying the mask over the image. The image may be focused on a particular area of interest being evaluated. The step of determining an objective evaluation of the carcass can include: counting a number of pixels that are within the specified color range in the image; dividing the number of pixels that are within the specified color range from the number of pixels in the image to get a ratio of colored pixels within the specified color range; determining if the ratio of colored pixels within the specified color range is greater than a threshold value; identifying the animal carcass as a marked animal carcass if the ratio of colored pixels within the specified color range is greater than the threshold value; identifying the animal carcass as a good animal carcass if the ratio of colored pixels within the specified color range is less than the threshold value; and/or saving the image associated with the marked carcass to a memory unit. The detection model can be designed to identify a color value, wherein the specified color range corresponds to the color value. In one embodiment, the processing unit may remove, or cause the carcass to be removed from a first section of the transport system onto a second section of the transport system.

A further aspect of the present invention is directed to a detection system configured to detect ink or other color marker on an animal carcass. The system may include a transport system, a data capture device, and an ink or color marker detection model. The detection model may include, or be in communication with, at least one processor and a memory unit with programmable instructions that when executed cause the at least one processor to: process the image of the animal carcass; determine an objective evaluation of the animal carcass by identifying a presence or absence of the ink on the animal carcass; and/or activate a microcontroller to initiate an ejection device when the presence of the ink is identified on the animal carcass. The step of processing the image of the animal carcass includes the detection model causing the processor to further: convert the image to a color format; and isolate a plurality of pixels of the image by creating a mask of any pixel value that is between an upper color format value and a lower color format value selected as a specified color range and applying the mask over the image. The detection model can be designed to identify a color value, wherein the specified color range corresponds to the color value. In one embodiment, the ejection device removes the carcass from a first section of the transport system onto a second section of the transport system.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the accompanying drawings, which form a part of the specification and are to be read in conjunction therewith in which like reference numerals are used to indicate like or similar parts in the various views.

DETAILED DESCRIPTION OF THE INVENTION

Figure 1:
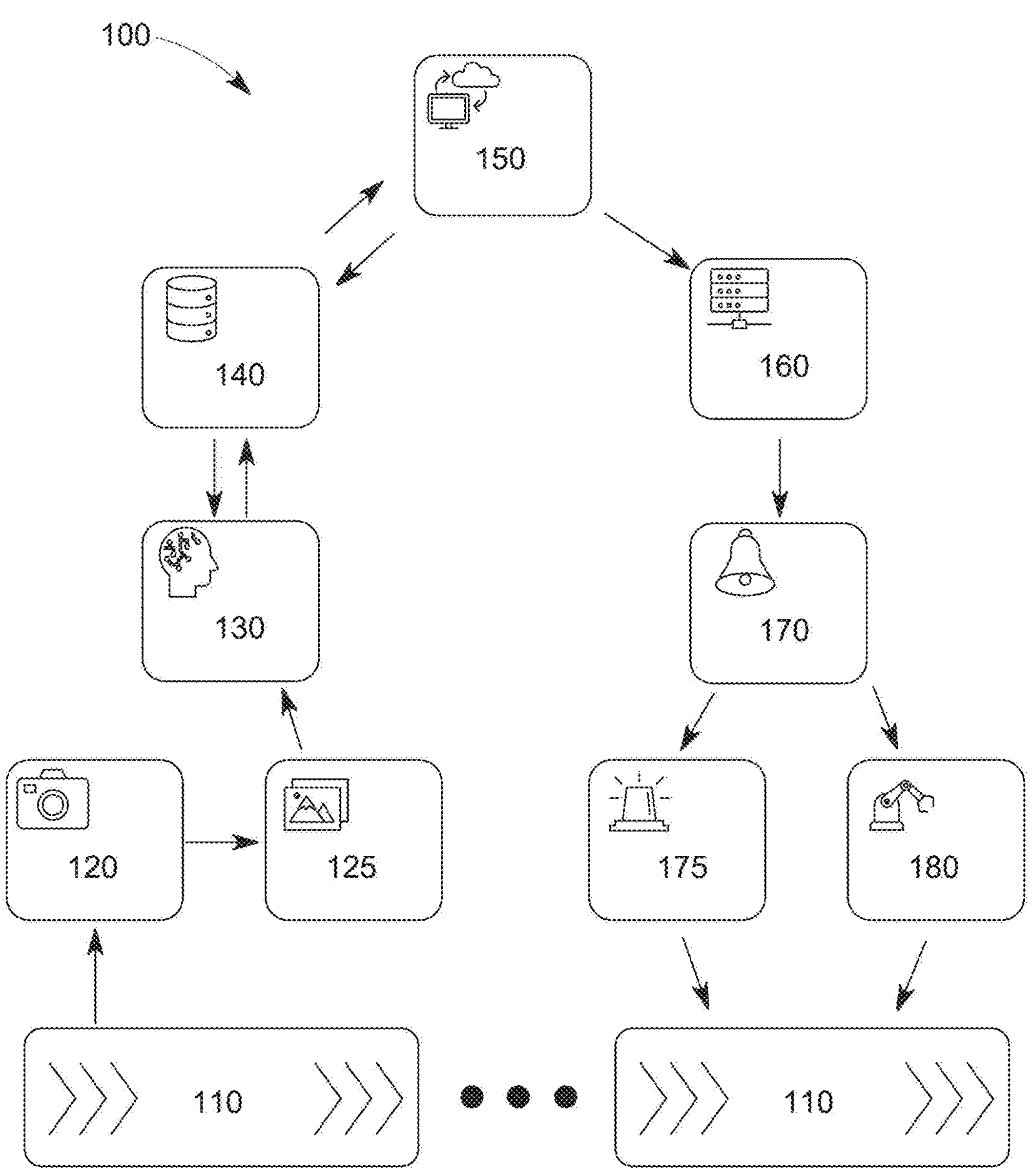
FIG. 1 is a block diagram of an advanced ink detection system for determining if an animal carcass, or a portion thereof, is marked with ink in accordance with an embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. It will be appreciated that some or all of the various features and structures described and shown with respect to each of the specific embodiments referenced herein may be combined to form additional or alternative embodiments having such combinations and that such combinations are within the scope of the present invention.

Referring to the figures, one embodiment and aspect of the present invention is directed toward a system and method for generating and executing an ink detection model to objectively analyze, evaluate, and characterize animal carcasses, or portions thereof. The system and processes described can also be used to iteratively train an ink detection model to detect ink markings or other color markings on an animal carcass or a portion thereof, including, but not limited to, a head or viscera set of a pork carcass. The system is configured to process and transform images and image data to provide an automated and objective determination whether or not the carcass is marked with ink based on detected pixels within a specific color range using an advanced ink detection model. In some aspects, ink may be used to mark a carcass. In other aspects, the carcasses may be marked with dye, powder, paint, pigment, colorant, solvent, resin, gel, another color-solution, or other suitable visual marker. In some aspects, the carcasses identified as being marked with ink are removed from the production line using an ejection device, such as a microcontroller, which is activated based on the detection of ink marking on a carcass or a portion thereof. The system may then use an iterative training process that can be updated and retrained based on updates to the images received and processed to provide a more efficient and accurate detection output.

As described in greater detail herein, the system and method of the present invention can allow for the detection of a feature on an animal carcass, like ink marking(s), on the kill floor, which may also be referred to as the harvest floor. In another embodiment, the detection of a plurality of features can be determined on the cut floor. In one embodiment, the ink detection model and associated ejection and/or removal of the carcass when ink is detected may be accomplished automatically without human involvement. This may allow for efficient and accurate identification of carcasses, or portions thereof, that are not edible, and removing these carcasses from the production line early in the processing pipeline leads to increased efficiency and utilization of the processing resources. It will be understood that the systems and methods described herein may be utilized in connection with the processing of carcasses of various meat-producing animals including, but not limited to, hogs, beef cattle, lambs, and others. Additionally, although the system and method described herein are discussed in relation to a carcass, or a portion thereof (e.g., a head), it will be understood that other types of meat cuts and/or carcass portions can be processed and identified using the disclosed system and method and processes described herein. Additionally, although the system and method described herein are related to determining ink marking, other characteristics and features can be determined in connection with the processes described herein.

FIG. 1 illustrates an advanced ink detection model 100 for use in identifying and classifying an animal carcass, or a portion thereof, as described herein. In various embodiments, the ink detection model 100 includes a networked system designed to perform one or more processes for advanced image processing and transforming data into an objective classification of the presence or absence of a feature based on the image processing. The ink detection model 100 may include, but is not limited to, a transport system 110, one or more data capture devices 120, a plurality of data elements 125, one or more feature detection models 130, one or more databases 140, a network 150, a controller 160, a notification system 170, an alert system 175, and a processing unit 180.

In various embodiments, the transport system 110 can be designed to move animal carcasses or meat samples through a meat processing system. According to some embodiments, the transport system 110 can be provided in the form of a conveyor belt, a rail system, a hook and gambrel system, a roller system, a timing belt, an automated line system, a chain, a robotic system, or another form of a production line. It will be understood by those skilled in the art that the embodiments described herein that the transport system 110 may also include additional hardware and software components (not shown) including, but not limited to, sensing devices, microcontrollers, switches, processors, and similar, to facilitate the operation of a production line or similar. In some embodiments, the transport system 110 can communicate with or be integrated with the network 150 for an overall monitoring system to perform advanced analytics related to the productivity and efficiency of the production line. In another embodiment, the transport system 110 can be a transportation system for moving meat from one location to a second location. In another embodiment, the transport system 110 can be communicatively connected to or otherwise integrated with the one or more data capture devices 120.

In various embodiments, the one or more data capture devices 120 can refer to a 2D camera, a 3D camera, an image capture device, scanning device, or other sensing devices. In one embodiment, the one or more data capture devices 120 may include an image sensor system and/or an image data capture system. In one embodiment, the data capture device 120 can be provided in the form of a deep learning camera. In one embodiment, the one or more data capture devices 120 may include a camera configured to obtain image data within a visual field. In at least this embodiment, the data capture device 120 can include a camera designed to trigger when an animal carcass comes within the visual field of the camera. In some forms, the data capture device 120 is designed to self-trigger using a photoelectric sensor or similar sensing device that closes an electrical connection when an object passes by the visual field (or other sensing area) of the data capture device 120, In some aspects, the data capture device 120 can be operated in a continuous (or near continuous) mode, such that the data capture device 120 is provided in the form of a live stream capturing image(s) based on an interval of frames per seconds. In some forms, the data capture device can be trained to accept or otherwise filter images where the carcass is in the correct field of view. The captured images can be further processed by the trained ink detection model 100, as described in more detail in connection with at least FIGS. 4-7. In one non-limiting example, the one or more data capture devices 120 may be configured to capture and/or retrieve the plurality of data elements 125, provided in the form of image files of a carcass or a portion thereof on the transport system 110. In some embodiments, the image files may be provided in the form of 2D image files, 3D image files, video files, or digital image files.

In one embodiment, the one or more data capture devices 120 may include an image sensor system. The image sensor system can include a presence detector system. In some embodiments, the presence detector system can be a photoelectric sensor (e.g., a photo eye). More specifically, in a non-limiting embodiment, the presence detector system can include a through-beam photoelectric sensor provided in the form of a transmitter and a detector. The transmitter can be designed to emit electromagnetic energy (e.g., infrared electromagnetic energy, visible electromagnetic energy, etc.) toward the detector. In this embodiment, the detector can be designed to detect the electromagnetic energy emitted by the transmitter. If the detector fails to detect the electromagnetic energy, the detector can generate a signal indicative of an object passing between the transmitter and the detector. In other embodiments, the presence detector system may be a through-beam photoelectric sensor that includes a transceiver in place of the detector and a reflector in place of the transmitter. In this alternative embodiment, the transceiver can emit electromagnetic energy toward the reflector, which reflects the electromagnetic energy to the transceiver. When a break in the electromagnetic energy is detected by the transceiver, the transceiver can generate a signal indicative of an object passing between the transceiver and the reflector. In other embodiments, the presence detector system may be a diffusing photoelectric sensor that is located on only one side of the transport system 110 and is capable of detecting the presence of an object on the transport system 110.

In one embodiment, the one or more data capture devices 120 can be connected to a computing device (not shown) through a high-speed cable linkage, such as USB 2, Fire- Wire, or through cable linkage to an image capture card on the computer, high-speed wireless linkages (e.g., 802.11n), or other network connections described in connection with the network 150 below, or similar connection, or a combination thereof. In one embodiment, the one or more data capture devices 120 is communicatively coupled to a computing device (not shown) via the network 150. In some embodiments, the one or more data capture devices 120 can be designed to send the plurality of data elements 125 to the computing device via the network 150. In some embodiments, the one or more data capture devices 120 can be provided in the form of a camera or image sensor system with an integrated computing device, processor, microcontroller or similar.

The computing device can be any device capable of executing processing options, including a network-capable device. The computing device can include a processor and a memory unit. The computing device can further include a display or other interface to configure, monitor, execute, and control various functions of the ink detection model 100. The computing device may include or otherwise be in communication with a processing unit 180. The processing unit 180 can include one or more machines on a production line and/or the transport system 110 that are configured to physically process carcasses, as described in more detail below.

In an embodiment where the one or more data capture devices 120 is a camera, and the plurality of data elements 125 are images or image files of an animal carcass, the resolution of an image can vary according to the distance of the camera from the surface of the carcass. In this embodiment, a method for maintaining a relatively constant distance of the camera from the surface of the carcasses can be used to maintain a constant resolution in the images.

In one embodiment, the plurality of data elements 125 can include image files captured by the one or more data capture devices 120. In one embodiment, the plurality of data elements 125 can include images of the carcasses, or a portion thereof, on the transport system 110. In one embodiment, the carcass is located on the transport system 110 within the field of view of the one or more data capture devices 120. In some embodiments, the carcass is specifically positioned on the transport system 110 to align within the field of view of the one or more data capture devices 120. In this embodiment, the one or more data capture devices 120 can be designed to capture the plurality of data elements 125, including but not limited to images, image files, video files, 3D point cloud, or a combination thereof. In some embodiments, the image files are minimally compressed to help enhance ink detection. In some embodiments, the image files may be compressed to improve image transfer speeds. It will be recognized by one skilled in the art that other types of data elements are contemplated within the scope of the embodiments described herein, including, for example, size, color, temperature, etc.

In one embodiment, the data capture process (e.g., imaging) can be taken over a short period of time, since the object or carcass, on which the measurements are taken are often moving continuously, and the cameras or other data capture devices 120 are fixedly positioned. In some embodiments, the one or more data capture devices 120 may be mounted or positioned using a movable apparatus, including a multi-directional track or adjustable axis device. In some aspects, the system may include one or more lighting elements to adjust the lighting of the carcasses in order to improve image quality and/or accuracy of the analysis. In some aspects, the lighting adjustments may be performed automatically based on sensed environment settings or other factors. In some examples, the lighting adjustments and/or desired lighting characteristics may be saved by the system. In some embodiments, the camera or other data capture device 120 may automatically adjust the brightness, contrast, saturation, or other image quality prior to image processing and analysis.

In some embodiments, the plurality of data elements 125 can be analyzed using one or more feature detection models 130. In certain embodiments, one or more features are extracted from an image of the carcass and analyzed using one or more feature detection models 130 to identify a plurality of features and classify the carcass. In certain embodiments, the plurality of data elements 125 are analyzed using one or more detection models 130 to predict the absence or presence of a plurality of features based on one or more parameters. In some embodiments, there may be multiple feature detection models 130, each develop and trained to detect and classify a particular feature. In other embodiments, the feature detection models 130 may be developed and trained to accurately identify and classify multiple types of features. For example, in one non-limiting embodiment, the feature detection models 130 may be provided in the form of an advanced image processing module, designed to identify the presence of a plurality of features in an image of a carcass. In another non-limiting example, the feature detection models 130 may be designed to detect ink or other markings on an animal carcass. In this embodiment, the features may include but are not limited to those shown and described in connection with FIGS. 2A-3B.

In certain embodiments, the ink detection model 100 and the one or more detection models 130 can include machine learning, artificial intelligence, a linear statistical model, a non-linear model, a logistic regression, a neural network, other processing models, other modeling and analysis techniques, or a combination thereof. In certain embodiments, the one or more models are created using AlexNet, GoogleNet, Python™, MatLab™, Cognex VisionPro™, Cognex In-Sight Vision Suite™, AWS SageMaker™, or other publicly available neural networks and/or deep-learning vison tools. The one or more detection models 130 are described in more detail in connection with the processes described in FIGS. 4-7.

The one or more databases 140 can generally refer to internal or external systems, data sources, scanning devices, or other platforms from which various data is received or collected. The one or more databases 140 can include the plurality of data elements 125, individual data points extracted therefrom, or other information processed, collected, or received by the ink detection model 100. The one or more databases 140 can further be used to process, clean, map, triangulate, or validate data across the ink detection model 100 or other embodiments of a networked feature detection system.

The collected data stored in the one or more databases 140 can include the plurality of data elements 125, including images and image files, calibration data, parameter data, validation data, threshold data, etc. The ink detection model 100 can receive or retrieve image data which may include but is not limited to raw data points, pixels, vectors, 3D point clouds, measurements, or similar information. The information received or collected by the ink detection model 100 can be stored in the one or more databases 140. In some embodiments, the one or more databases 140 can be provided in the form of a memory unit, processor, elastic cache system, cloud storage, or similar. In some aspects, the ink detection model 100 is designed to identify whether a carcass is marked with ink or not. The images associated with carcasses marked with ink may be saved in a database, or portion thereof, separate from images associated with carcasses not marked with ink.

The one or more databases 140 can include module data associated with iteratively training the ink detection training module(s) and other modeling processes described herein. Non-limiting examples of module data can include but are not limited to, machine learning techniques, parameters, guidelines, emphasis values (e.g., weight values), input and output datasets, training datasets, validation sets, configuration properties, and other settings. In one example, module data includes a training dataset including historical image data, carcass composition metrics, calibration data, lighting adjustment data, camera settings and controls, color settings, and other data points. In this example, the training dataset can be used for training an ink detection training module to provide an objective feature classification based on a specific feature parameter or other classification value. For example, the system may use the training module data to iteratively train an ink detection model to identify ink on a carcass, based at least in part on historical data from the one or more databases 140 while also incorporating new data from expected new carcass images.

In some embodiments, the devices and aspects of FIG. 1 can communicate directly with one another over the network 150. The network 150 includes, for example, the Internet, intranets, extranets, wide area networks ("WANs"), local area networks ("LANs"), wired networks, a coaxial cable data communication network, an optical fiber network, a direct wired serial communication connection (e.g., USB), wireless networks, such as a Wi-Fi network, a radio communication network, a cellular data communication network (e.g., 4G, 5G, LTE, etc.), a direct wireless communication connection (e.g., Bluetooth, NFC, etc.), or other suitable networks, or any combination of two or more such networks. For example, such networks can include satellite networks, cable networks, Ethernet networks, and other types of networks. In some embodiments, the network may be a private network (e.g., a private LAN), a public network (e.g., the internet), or a combination of private and/or public networks.

The ink detection model 100 can include one or more controllers 160 provided in the form of a programmable logic controller (PLC), or similar control device. In some embodiments, the one or more controllers 160 can be constructed, programmed, configured, or otherwise adapted, to autonomously carry out a function or set of functions of the processes described herein. A controller 160 can include one or more components, including both software and/or hardware components, including an application-specific integrated circuit (ASIC) or field programmable gate array (FPGA), in some embodiments. In some embodiments, the controller 160 can include a combination of hardware and software, such as by a microprocessor system or similar processor module, wherein the process module can be designed to execute a set of program instructions by the controller to perform one or more steps of the processes provided herein.

In some embodiments, at least a portion of a controller 160 can be executed on the processor(s) of one or more computing platforms or computing devices to execute one or more control functions including but not limited to multitasking, multithreading, distributed (e.g., cluster, peer-peer, cloud, etc.) processing, and similar processing techniques. Further, the controller 160 can further include one or more subassemblies, modules, or similar, each of which can be provided in the form of an individually operated controller.

Moreover, in the embodiments described herein, the one or more controllers 160 can execute functions autonomously, however semi-autonomous or operator-controlled, or similar, operations are also contemplated in some embodiments. Further, wherein one controller 160 is described to execute an instruction to perform a function herein, it will be understood by one skilled in the art that one or more subassemblies or controllers can execute individual tasks or functions.

The controller 160 can be any device capable of transmitting and/or executing processing instructions, including a network-capable device. The controller 160 can include at least one processor and a memory unit. The controller 160 can include a display or other interface to configure, monitor, execute, and control various functions of the ink detection model 100. The controller 160 may include or otherwise be in communication with a processing unit 180. In at least one embodiment, the controller 160 may be designed to receive and process one or more images of the carcass, and determine the appropriate processing line or processing section for the carcass based on whether ink or another feature is detected on in the image. In this embodiment, the controller 160 can send a signal to the processing unit 180 to move or transport the carcass to the appropriate processing line or processing section. For example, when ink is detected on an animal head, the processing unit 180 may remove the animal head from a first aspect of the transport system 110 to a second aspect of the transport system 110. In at least this way, the controller 160 can be provided in the form of a deep learning controller. In some embodiments, the data capture, data processing, and output determination may be performed by a single device configured of hardware and/or software.

In some embodiments, the ink detection model 100 can generate a prediction or classification of the presence or absence of ink on a carcass, or a portion thereof. The ink detection model 100 can generate a notification via a notification system 170 to communicate a classification (e.g., presence of ink, percentage of pixels within a specific color range identified, percent certainty, etc.). In some embodiments, the notification system 170 can include a user interface, a communication interface, or a combination thereof.

In one embodiment, a user interface of the notification system 170 can be a computing device and can be in communication with one or more input or output devices (not shown) that are capable of receiving inputs into and/or outputting any outputs from the computing device or other aspects of the notification system 170. Embodiments of input devices can include but are not limited to, a keyboard, a mouse, a touchscreen display, a touch-sensitive pad, a motion input device, a movement input device, an audio input, a pointing device input, a joystick input, a keypad input, peripheral device, foot switch, or similar input device. Embodiments of output devices can include but are not limited to, an audio output device, a video output, a display device, a motion output device, a movement output device, a printing device, or a similar output device. In some embodiments, the user interface includes hardware that can be designed to communicate with one or more input devices and/or output devices via wired and/or wireless connections.

In some embodiments, the notification system 170 can further include an alert system 175 to provide an audible and/or visual alert at the detection of ink on a carcass, or a portion thereof. In some embodiments, the alert system 175 can be in communication with the notification system. In some embodiments, both the notification system 170 and the alert system 175 may be provided in the form of integrated subsystems to the controller 160. In some embodiments, the alert system 175 may be provided in the form of a light bar or similar illuminated notification device.

The ink detection model 100 can further include a processing unit 180. The processing unit 180 can include one or more machines on a production line that are configured to physically move or process carcasses according to the outputs and/or signals generated by the system and processes described herein. In some embodiments, the processing unit 180 can be provided in the form of an ejector designed to remove the carcass marked with ink to a separate aspect of the transport system 110 from the non-marked carcasses. In at least this way, the system and method described herein may be used to sort the carcasses into different sections and/or aspects of the production line according to the output of the ink detection system, as described in more detail in connection with at least FIG. 4.

The ink detection model 100 may further include a computing environment provided in the form of one or more computing devices that communicate together over the network 150. According to some embodiments, the elements of the computing environment can be provided in the form of a plurality of computing devices that may be arranged, for example, in one or more server banks or computer banks, or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time.

Computing devices and other devices discussed herein can include a memory unit. A memory unit can comprise volatile or non-volatile memory to not only provide space to execute program instructions, algorithms, or the advanced analytics models described herein, but to provide the space to store the instructions, data, and other information. In embodiments, volatile memory can include random access memory (RAM), dynamic random-access memory (DRAM), or static random-access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

Figure 2A:
FIG. 2A is a representative diagram of a portion of an animal carcass without ink marking, suitable for identification and classification by the present invention.
Figure 2B:
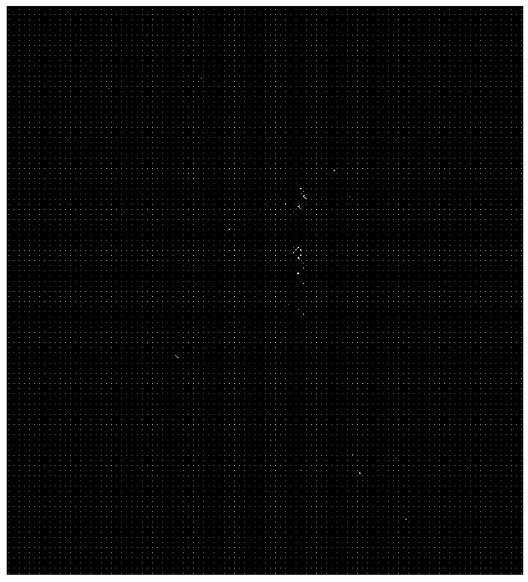
FIG. 2B is a representative diagram of pixels identified in a specific color range through processing an image in accordance with an embodiment of the present invention.

As shown in FIG. 2A, in one embodiment, a high-resolution image is obtained of a portion of an animal carcass. FIG. 2A is a representative photograph of a pork carcass head without ink markings. The image of FIG. 2A may be processed as described in connection with FIGS. 4-7 to generate a pixelated representation of the image, as shown in FIG. 2B. In this non-limiting example, the ink detection model 100 is configured to detect blue ink, so the image of FIG. 2B shows the isolated pixels within a specified color range associated with the blue ink, of which there is less than a threshold amount, indicating that the image of FIG. 2A does not contain an ink marked head. In another example, the ink detection model 100 may be configured to detect a different color ink or color value, such as violet, indigo, purple, etc., so the image shows the isolated pixels within a specified color range associated with the color value.

Figure 3A:
FIG. 3A is a representative diagram of a portion of an animal carcass with ink marking, suitable for identification and classification by the present invention.
Figure 3B:
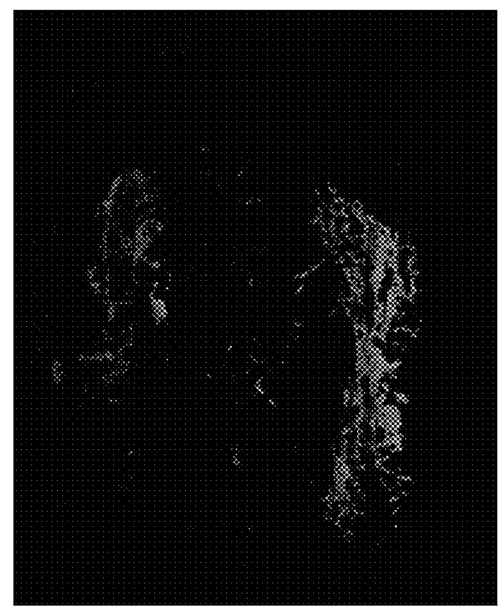
FIG. 3B is a representative diagram of pixels identified in a specific color range through processing an image in accordance with an embodiment of the present invention.

As shown in FIG. 3A, in one embodiment, a high-resolution image is obtained of a portion of an animal carcass. FIG. 3A is a representative photograph of a pork carcass head with ink markings. The image of FIG. 3A may be processed as described in connection with FIGS. 4-7 to generate a pixelated representation of the image, as shown in FIG. 3B. In this non-limiting example, the ink detection model 100 is configured to detect blue ink, so the image of FIG. 3B shows the isolated pixels within a specified color range associated with the blue ink, of which there is greater than a threshold amount, indicating that the image of FIG. 3A does contain an ink marked head. In another example, the ink detection model 100 may be configured to detect a different color ink or color value, such as violet, indigo, purple, etc., so the image shows the isolated pixels within a specified color range associated with the color value.

Figure 5:
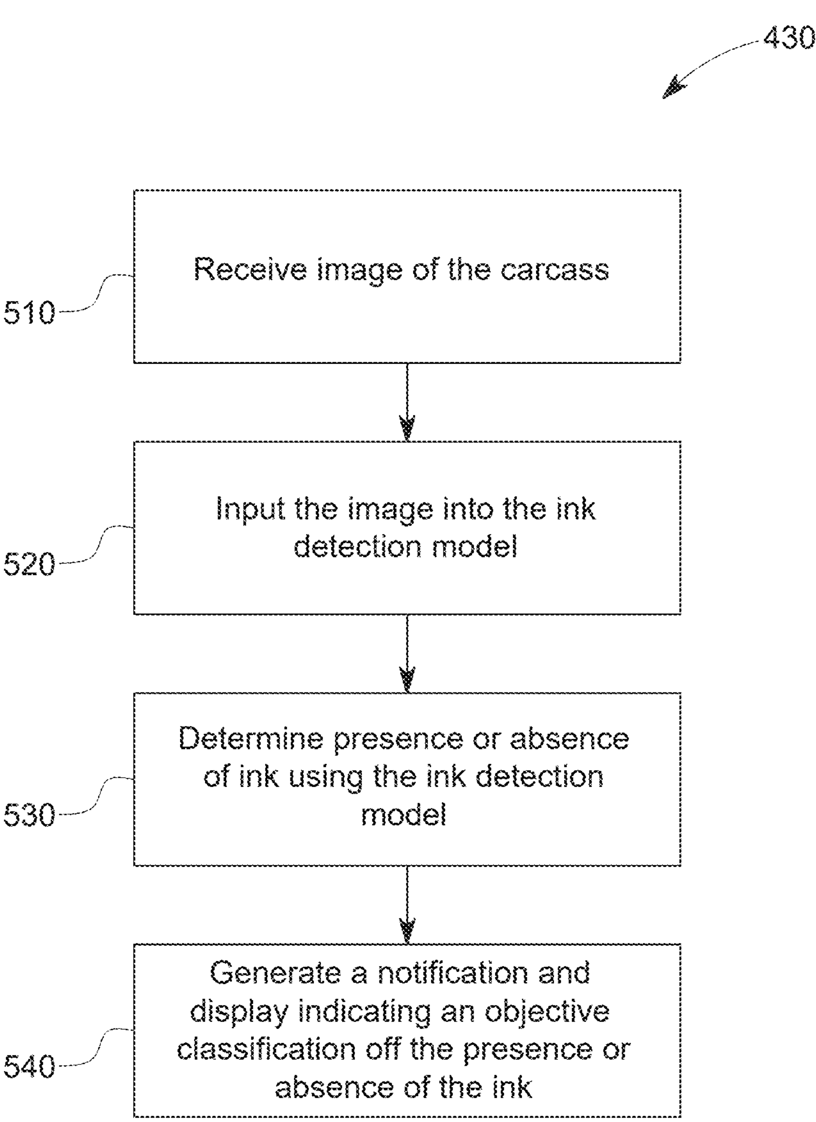
FIG. 5 is a flow diagram of a process for evaluating a carcass or a portion thereof as an input of the ink detection model for determining the presence or absence of ink on a carcass or a portion thereof in accordance with an embodiment of the present invention.
Figure 6:
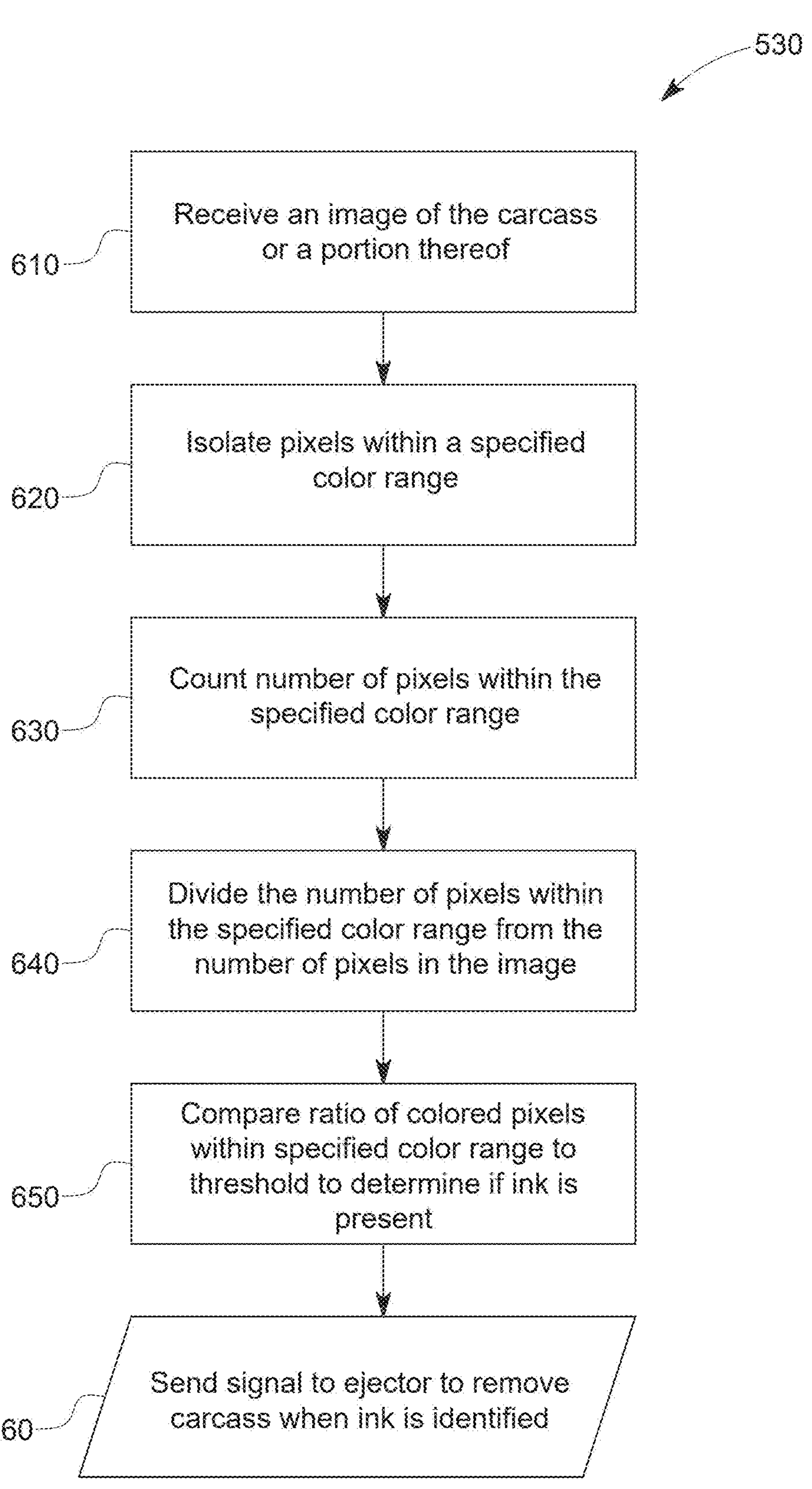
FIG. 6 is a flow diagram of a process for determining a presence or an absence of ink using the ink detection model in accordance with an embodiment of the present invention.
Figure 7:
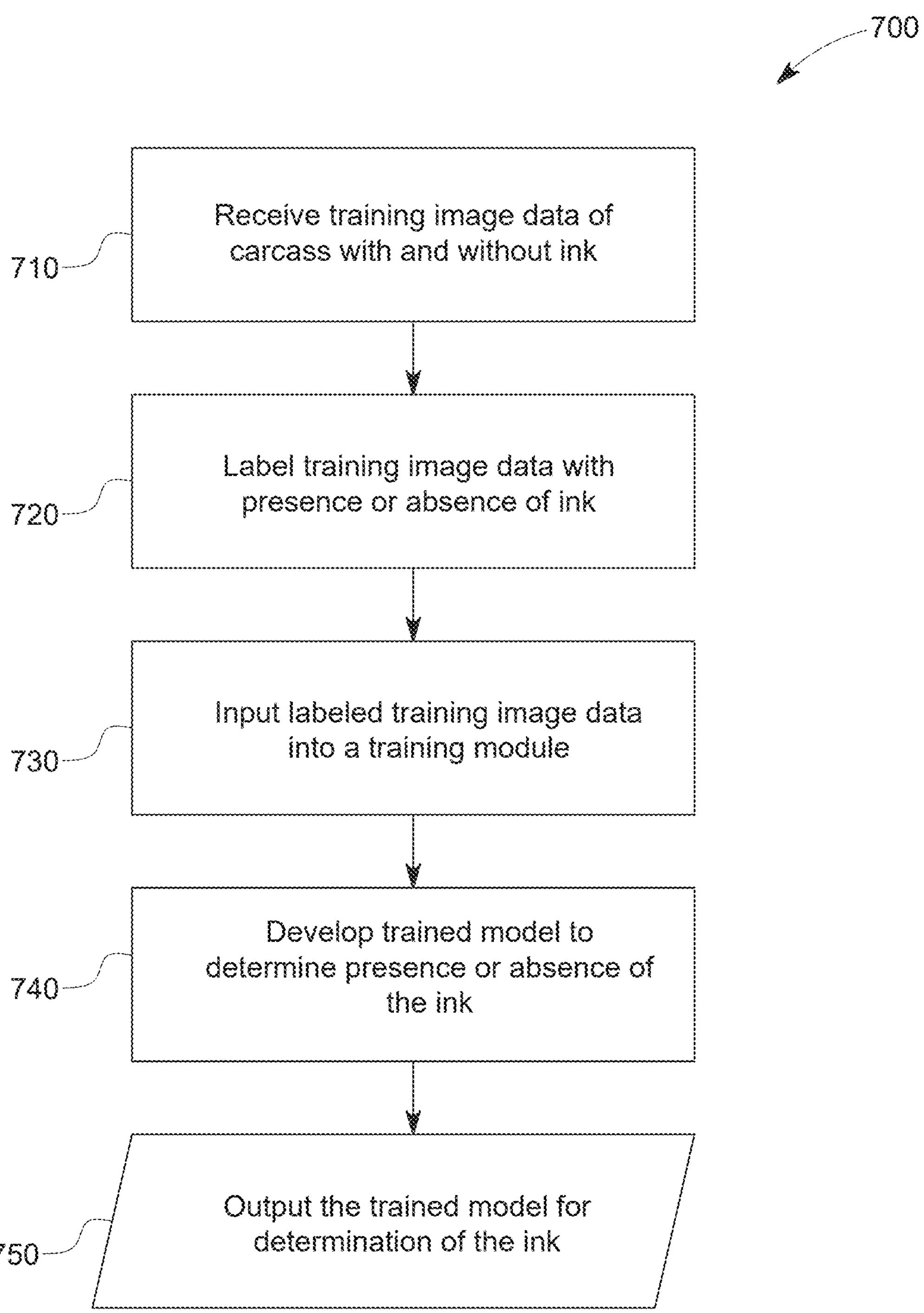
FIG. 7 is a flow diagram of a process for developing a trained ink detection model for determining the presence or absence of ink on an animal carcass in accordance with an embodiment of the present invention.

FIGS. 4-7 are flow diagrams illustrating the training, operation, and implementation of the ink detection model 100, according to one representative embodiment. The process includes two main phases: inference (operation) of the one or more feature detection models 130 (FIGS. 5 and 6) and iteratively training the ink detection model 100 (FIG. 7).

When used throughout the present disclosure, one skilled in the art will understand that processes for "iteratively training the training module" can include machine learning processes, artificial intelligence processes, and other similar advanced machine learning processes. For example, the system and processes of the present disclosure can detect ink markings or other features that may have different individualized parameters and can leverage the known characteristics of other identified ink markings with similar metrics as an input to an iterative training process for an automated detection and objective classification of ink and/or other feature. Although the examples described in connection with FIGS. 4-7 related to detecting ink on a carcass or a portion thereof, it will be appreciated by one skilled in the art that the processes and methods may be applied to detect other features instead of or in addition to ink markings and/or on a meat sample instead of a carcass.

Figure 4:
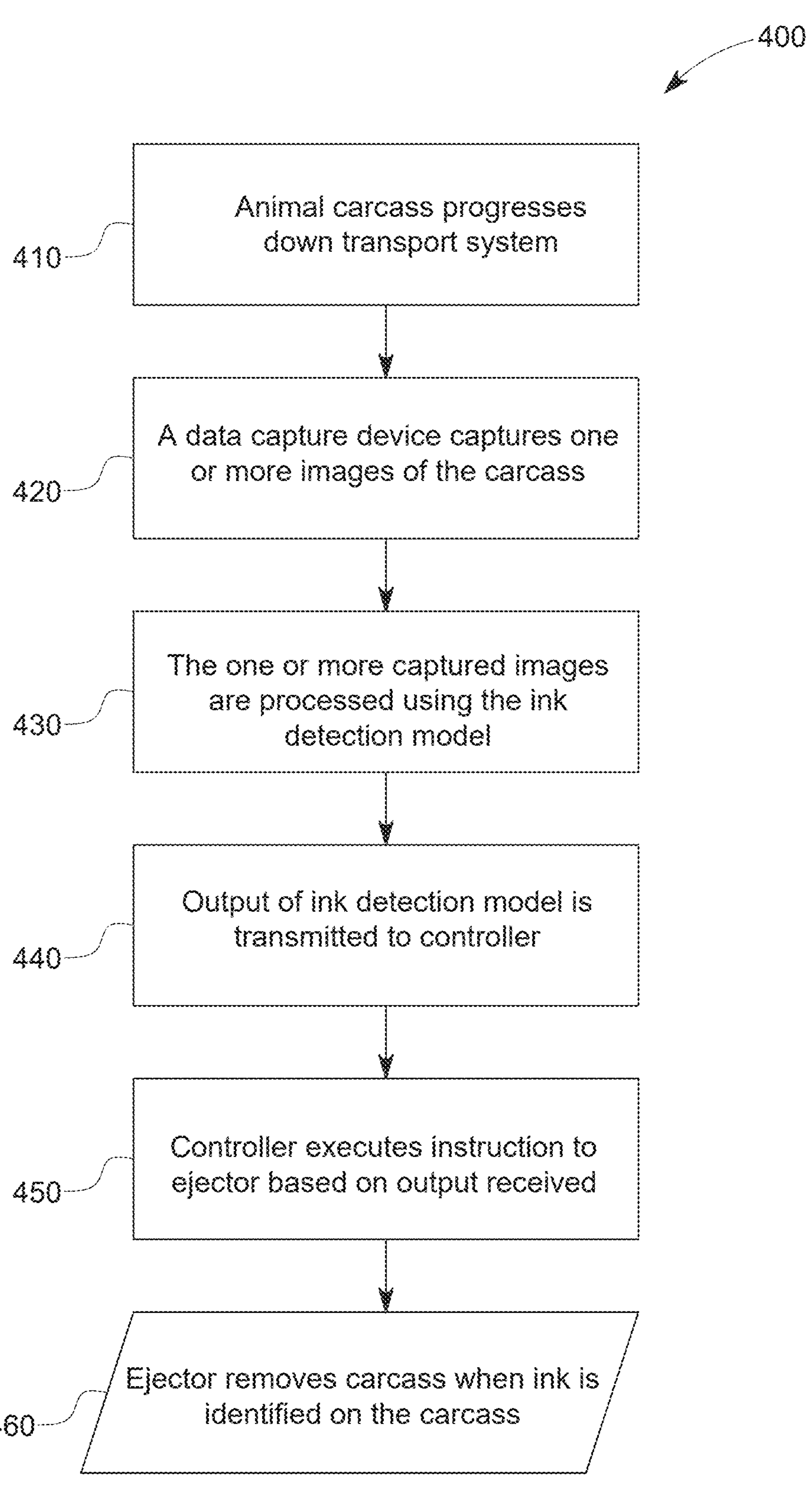
FIG. 4 is a flow diagram of a process for evaluating a carcass or a portion thereof as an input of an ink detection training model for determining the presence or absence of ink on a carcass or a portion thereof in accordance with an embodiment of the present invention.

A representative, non-limiting example of an ink detection process 400 executed by the ink detection model 100 is shown in FIG. 4. In one embodiment, the trained ink detection model 100 may be developed and used in an ink detection process 400 to determine the presence or absence of colored ink, or one or more other features, on an animal carcass. At step 410, an animal carcass is moved along a kill floor of a production facility, in a non-limiting example. At step 420, one or more images of the animal carcass are captured, received, or otherwise collected by one or more data capture devices 120, such as a camera or other imaging device. In some embodiments, the one or more images of the carcass can be obtained while the carcass is being transported by the transport system 110, or similar transport system, as described in more detail in connection with FIG. 1.

In some embodiments, the one or more images include image data, image files, video files, or other data elements 125 as described in connection with FIG. 1. In some embodiments, the one or more images can include 2D image files, 3D image files, a 3D point cloud, digital files, or video files of animal carcasses with or without ink markings and/or a plurality of features. In some embodiments, the image data capture system used to obtain the training image data (as described in connection with FIG. 7) is the same as the image data capture system that will be used to obtain image data of the carcasses after the trained image analysis model is created. In some embodiments, low-quality images (e.g., blurry, too dark, too bright, etc.) can be automatically excluded from the image data. In some embodiment, the image data may be pre-processed, filtered, or otherwise analyzed, edited, or processed before step 420 or throughout other steps of the ink detection process 400.

In some embodiments, the one or more images of the carcass are input into the ink detection model 100 at step 430. In at least this way, the ink detection model 100 is provided in the form of a trained image analysis model. The ink detection model 100 may be operating on a computing device, such as a local computing device at the data capture device system or a computing device remote from the local computing device. The trained image analysis model can be designed to detect the presence or absence of ink markings and/or one or more features based on the image data of the one or more images of the animal carcass. The trained image analysis model analyzes the image data associated with the one or more images and makes a determination of the presence or absence ink at step 430, as described in more detail in connection with FIGS. 5 and 6.

In some embodiments, the determination of the presence or absence of a feature at step 430 may further include an indication of a degree of certainty as to the determination. In some embodiments, the indication of the degree of certainty can include a validation process and a calculation of an error metric.

In one specific example, the determination of the presence of a feature (e.g., ink markings) on the carcass is communicated to a controller 160 communicatively connected to an ejector or other routing system that can be designed to remove the animal carcass from the transport system using the ejector or similar processing unit 180 at step 450 based on receiving a signal from the controller at step 440. In this example, the ejector can move a carcass, portion thereof, or other meat sample to a particular processing line or area of the processing facility based on the presence or absence of ink at step 460, such as removing animal carcasses, or portions thereof marked with ink so they do not appear in the processing line with the non-marked animal carcasses. In some embodiments, the ejector or other processing unit 180 can route animal carcasses, portions thereof, or other meat samples to a specific processing station, cutting station, packaging station, and/or labeling station based on the presence or absence of ink markings and/or one or more other features.

In some embodiments, the trained image analysis model can be developed based on input vectors, which are indicative of a characteristic of the carcasses. In one example, the input vector may be the variation in the color of the pixels detected in an image of the animal carcass. In other examples, the input vectors may be colors in the visible spectrum, peaks of wavelengths detected in non-visible electromagnetic energy (e.g., ultraviolet, infrared), the presence and numbers of different types of non-meat tissue (e.g., bone, fat), the presence and/or absence of a cut, the presence and/or absence of one or more defects, or any other number of possible input vectors or parameters.

The use of input vectors for training may help the trained ink detection model identify the presence or absence of a feature on an animal carcass without characteristics that a person would normally look for when manually identifying or sorting animal carcasses. The use of the input vectors allows the trained ink detection model to detect the presence of ink markings, for example, on an animal carcass, without the need for a human to evaluate the carcass. After the input vectors are modeled, a trained ink detection model can be developed as a decision-making process based on a number of the input vectors. Examples of decision-making processes include decision trees, neural networks, and the like. In some embodiments, the decision-making process of the trained detection model is based on a determination of an acceptable arrangement of the input vectors in the decision-making process.

As shown in FIG. 5, the ink detection model 100 can further be used to perform advanced image analysis techniques on the one or more data elements 125 during the detection step 430 to identify the presence or absence of ink markings on a carcass. In some embodiments, the images collected from the one or more data capture devices 120 in step 420 of FIG. 4, are received or retrieved by the ink detection model at step 510. The one or more images are then used as an input to the ink detection model at step 520.

As described in connection with FIG. 4, once the trained image analysis model makes the determination of an objective identification and detection of ink markings on a carcass at step 530, the system can generate a notification at step 540 and communicate the ink identification and detection to one or more controllers 160. In some embodiments, the feature detection process at step 530 is performed by matching one or more feature parameters of the ink detection model 100 with one or more feature parameters of the input image data. In this embodiment, the system identifies the presence or absence of ink markings on the animal carcass. In some embodiments, the notification system 170 generates the notification. In some embodiments, the notification can be received by one or more display or other user interface devices. The notification may also be communicated via a communication interface to one or more external devices, communicated over the network 150, stored in one or more databases 140, or another output method.

As shown in FIG. 6, in one embodiment, the ink detection model 100 can further be used in an advanced image analysis process 600 to determine the presence or absence of ink on a carcass, like at step 530 of FIG. 5. In some embodiments, the images collected from the one or more data capture devices 120 in step 420 of FIG. 4, are received or retrieved by the ink detection model at step 610. In some embodiments, an image may be cropped to remove background materials, reduce the size of the image, or center or otherwise focus the image on the particular area of interest being evaluated.

The one or more images are used as an input to the ink detection model, which isolates the pixels of an image at step 620. The pixels are isolated based on a specific color range associated with the ink being detected. In some aspects, the image(s) may be converted or otherwise transformed into a hue, saturation, and value (HSV) format before isolating the pixels. In other aspects, the image(s) may be converted or otherwise transformed into other color format options, such as, for example, Red, Green, and Blue (RGB). In yet other aspects, the image(s) may be converted or otherwise transformed into yet another color format option such as, for example, or L*, a*, b*, etc, where L* indicates lightness, a* represents the green-red component, and b* represents the blue-yellow component. In some forms, the specific color range associated with the ink being detected is configured in color settings by a user, or automatically by the system. In some examples, the specific color range corresponds to the HSV or other color format value of color of ink being detected. In some embodiments, the pixels of the image are isolated by creating a mask of any pixel value that is between an upper HSV value (or upper value of another color format option) and a lower HSV value (or lower value of another color format option) selected as a specified color range and applying the mask over the image. In some examples, the upper HSV value (or upper value of another color format option) and the lower HSV value (or lower value of another color format option) are saved in a memory unit associated with the ink detection model 100. After the pixels associated with the specific color range are isolated at step 620, the system counts the number of pixels identified as being within the specific color range at step 630. At step 640, the number of pixels within the specific color range is divided from the number of pixels in the image overall.

At step 650, the system compares the ratio of the specific-colored pixels to the total number of pixels to determine if the number of specific-colored pixels is above a threshold amount that is associated with ink markings being present on the carcass. If the ratio of the number of specific-colored pixels is less than the threshold amount, then the ink detection model 100 determines that the carcass is not marked with ink. The threshold amount may be established via a user, or automatically using the system via the training process. As described in connection with FIG. 4, once the ink detection model 100 makes the determination of an objective identification and detection of ink markings on a carcass at step 650, the system can generate and send a signal to the ejector, or similar controller 160 to remove the carcass that is identified as being marked with ink at step 660.

As depicted in FIG. 7, in one embodiment, the iterative training process 700 for iteratively training the ink detection model 100 and/or the one or more detection models 130 begins with receiving or otherwise obtaining image data of animal carcasses, portions thereof, meat cuts, or meat samples with and without a feature (e.g., ink markings) at step 710. The image data will be labeled for the presence or absence of a feature by visual inspection at step 720. In some embodiments, step 720 can be completed by a human. In another embodiment, the step 720 can be completed by an automated image processing or analysis system, a robotic system, an artificial intelligence system, or similar. In one example, an image can be tagged (either by user input or via image processing analysis techniques) as being an image of an ink marked carcass or portion thereof (e.g., pork head). This image can be stored in the one or more databases 140, including the associated feature parameters associated with the image. The image data and feature parameters can then be matched to other images to determine if they also have the ink markings. In some embodiments, low-quality images (e.g., blurry, too dark, too bright, etc.) were excluded from the training image data.

The labeled training image data can then be input into a training module at step 730. In some embodiments, the labeled training image can be validated by either manual or automated techniques before the input at step 730. The labeled training image data is used to iteratively train or teach the ink detection model to identify ink markings on a carcass at step 740. After the training module, a trained ink detection model for determining the presence or absence of ink markings (and/or other feature(s)) is developed, output, and saved at step 750.

In some embodiments, the trained ink detection model includes a neural network that has several layers. In one embodiment, the neural network is a multilayer neural network. In some embodiments, the input nodes represent inputs into the trained models (e.g., image data, metadata associated with the image data, etc.), one or more of the hidden nodes (e.g., one of the layers of hidden nodes) may represent one of the input vectors determined during the development of the detection model, and the output node represents the determined type of the meat being analyzed.

In some embodiments, to iteratively train the ink detection model 100 and/or the one or more detection models 130, the system can compare a set of training outcomes from each of a plurality of training data sets and update one or more emphasis guidelines, classification values, characteristics, parameters, or similar. Additionally, in some embodiments, the comparison of the plurality of training data set outcomes can allow for the calculation of one or more error metrics between the input data and the output data. In at least one embodiment, the system can include a plurality of detection models 130, configured to generate outcomes, predictions, or classifications based on a particular data element characteristic. In some embodiments, the particular data element characteristic can include parameters related to the carcass, a specific feature, the type of carcass, or one or more image capture considerations (e.g., illumination consistency, glare, color, etc.). The trained detection model can be implemented for determining the presence or absence of ink markings on an animal carcass, as described in connection with FIGS. 4-6.

In some embodiments, a training module performs the iterative training of the one or more detection models 130. In some embodiments, the one or more detection models 130 can include an architecture with a certain number of layers and nodes, with biases and emphasis guidelines between the nodes. During training, the training module can determine the values of parameters weights and biases) of the machine learning model, based on a set of training samples. In one embodiment, the training module receives a training set for training. The training samples in the training set can include images captured by the camera. For supervised learning, the training set typically also includes tags or labels for the images. The tags or labels can include whether or not an animal carcass is marked with ink.

In an example of iterative training, a training sample is presented as an input to the one or more detection models 130, which then produces an output for a particular feature. The difference between the output of the one or more detection models 130 and a known output is used by the training module to evaluate and adjust (as needed) the values of the parameters in the one or more detection models 130. This is iteratively repeated for a plurality of training samples to improve the performance of the one or more detection models 130.

The training module can also validate the trained ink detection model 100 and/or the one or more detection models 130 based on additional validation samples. For example, the training module applies the one or more detection models 130 to a validation sample set to quantify the accuracy of the one or more detection models 130. The validation sample set can include images with associated known attributes. The output of the one or more detection models 130 can be compared to the known attributes of the validation sample set. In one embodiment, developing the one or more detection models 130 can include using validation data to compare to training data to determine if the one or more detection models 130 was being overfitted to the training data.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations, locations, etc. have been described for use with disclosed embodiments, others besides those disclosed may be utilized without exceeding the scope of the invention.

Persons of ordinary skill in the relevant arts will recognize that the subject matter hereof may comprise fewer features than illustrated in any of the individual embodiments described above. The embodiments described herein are not meant to be an exhaustive presentation of how the various features of the subject matter herein may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical, or other property, such as, for example, molecular weight, viscosity, etc., is from 100 to 1,000, it is intended that all individual values, such as 100, 101, 102, etc., and sub-ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01, or 0.1, as appropriate. For ranges containing single-digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

As used herein, "a," "an," or "the" can mean one or more than one. For example, "an" image can mean a single image or a plurality of images.

The term "and/or" as used in a phrase such as "A and/or B" herein can include both A and B; A or B; A (alone); and B (alone). Likewise, the term "and/or" as used in a phrase such as "A, B, and/or C" can include at least the following embodiments: A, B, and C; A, B, or C; A or C; A or B; B or C; A and C; A and B; B and C; A (alone); B (alone); and C (alone).

As used herein, the term "about" when referring to a measurable value such as an amount, a temporal duration, and the like, can include variations of +/−20%, more preferably +/−10%, even more preferably +/−5% from the specified value, as such variations are appropriate to reproduce the disclosed methods and systems.

As used herein, the term "meat" or "meat sample" as used herein can include a meat product, a meat cut, a trim specification, or other composition harvested from an animal.

As used herein, the term "ink" or "inked" can include ink, dye, powder, paint, pigment, colorant, solvent, resin, gel, another color-solution, or other visual marker.

As used herein, the term "carcass" can refer to a body of a dead or slaughtered animal, or a portion thereof, which may optionally be dressed (e.g., some or all of viscera, offal, entrails, and/or hide removed) and/or a head of animal, which may belong to a hog, beef cattle, lamb, and others.

As used herein, "statistical measures" can include the mean, the median, a percentile value, a variance, a standard deviation, or similar statistical measures, such as additional measures that can be derived from the above.

Features can include statistical measures. A feature can include one or a small number of values derived from the pixel values of the data capture device 120. In some embodiments, the features can include color features, shape features, topological features, physiological features (e.g. pH or protease levels), and more. In some embodiments, analysis of the feature can reduce the very large amount of information in an image (often millions of pieces of information, as an image can have millions of pixels, each with multiple intensity values) into a small number of values for use in a decision algorithm. In some embodiments, the analysis of one or more of the features can include "calculating" the features, "computing" the features, "extracting" the features, or other such actions connoting the derivation of the features from the underlying images. In some embodiments, the image analysis and/or extraction can be performed or executed by a computing device, or similar, as described herein.

As used herein, "topological features" can include features related to the physical arrangement of ultrastructural elements, both in an absolute sense (e.g. a size, distance, or area) as well as relative sense (e.g. relative direction, relative size, relative distance, relative area).

As used herein "color values" can include hue, saturation, lightness, red value, green value, blue value, magenta value, cyan value, yellow value, Lab space value, L*a*b* space value, or any other value derived from obtaining images from specific spectral regions, and which can involve the comparison of such values.

As used herein, "decision algorithms" can include any mapping or other process of assigning features from the high-resolution imaging, and which can additionally include values or attributes determined by means other than high-resolution imaging, into a meat analysis and feature determination.

The constructions described in the accompanying materials and illustrated in the drawings are presented by way of example only and are not intended to limit the concepts and principles of the present invention. Thus, there has been shown, and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations, and other uses and applications of the present construction will, however, become apparent to those skilled in the art after considering the specification and the accompanying drawings. All such changes, modifications, variations, and other uses and applications which do not depart from the spirit and scope of the invention are deemed to be covered by the invention which is limited only by the claims which follow.

What is claimed is:

1. An ink detection system designed to detect ink on an animal carcass comprising:

a transport system designed to move the animal carcass through a meat processing facility;

a data capture device designed to capture one or more images of the animal carcass as it moves on the transport system;

an ink detection model including at least one processor and a memory unit with programmable instructions that when executed cause the at least one processor to:

receive an image of the one or more images received from the data capture device;

isolate a plurality of pixels of the image that are within a specified color range associated with the ink being detected;

count a number of pixels that are within the specified color range;

divide the number of pixels that are within the specified color range from the number of pixels in the image to get a ratio of colored pixels within the specified color range;

determine if the ratio of colored pixels within the specified color range is greater than a threshold value consistent with a carcass marked with ink; and activate a controller in communication with a processing unit configured to remove the animal carcass when the ratio of colored pixels is greater than the threshold value.

2. The ink detection system of claim 1 further comprising an ejection device that removes the animal carcass from a first section of the transport system and onto a second section of the transport system when the ratio of colored pixels is greater than the threshold value.

3. The ink detection system of claim 1, wherein the ink detection model is designed to identify a color value, wherein the specified color range corresponds to the color value.

4. The ink detection system of claim 1, wherein the animal carcass is identified as being marked when the ratio of colored pixels within the specified color range is greater than the threshold value.

5. The ink detection system of claim 4, wherein the ink detection model further causes the processor to save the image associated with a marked animal carcass to the memory unit.

6. The ink detection system of claim 1, wherein the data capture device is provided in the form of an RGB camera.

7. The ink detection system of claim 1, wherein the ink detection model further causes the processor to:

convert the image to a color format prior to isolating the plurality of pixels.

8. The ink detection system of claim 7, wherein isolating the plurality of pixels includes creating a mask of any pixel value that is between an upper color format value and a lower color format value selected as the specified color range and applying the mask over the image.

9. A method for identifying an animal carcass marked with ink using an ink detection model, the method comprising:

transporting the animal carcass using a transport system;

triggering a data capture device as the animal carcass moves on the transport system;

processing an image of the animal carcass captured by the data capture device using at least one processor of the ink detection model;

determining an objective evaluation of the animal carcass by identifying a presence or absence of the ink from a plurality of pixels of an image that are within a specified color range associated with the ink being detected on the animal carcass;

determining if a ratio of colored pixels within the specified color range is greater than a threshold value associated with the ink being detected; and activating a controller in communication with a processing unit configured to remove the animal carcass when the presence of the ink is identified on the animal carcass.

10. The method of claim 9, wherein processing the image of the animal carcass includes:

converting the image to a color format; and isolating a plurality of pixels of the image by creating a mask of any pixel value that is between an upper color format value and a lower color format value selected as a specified color range and applying the mask over the image.

11. The method of claim 10, further comprising:

focus the image on a particular area of interest being evaluated.

12. The method of claim 10, wherein determining an objective evaluation of the animal carcass includes:

counting a number of pixels that are within the specified color range in the image;

dividing the number of pixels that are within the specified color range from the number of pixels in the image to get a ratio of colored pixels within the specified color range;

determining if the ratio of colored pixels within the specified color range is greater than a threshold value;

identifying the animal carcass as a marked animal carcass if the ratio of colored pixels within the specified color range is greater than the threshold value; and identifying the animal carcass as a good animal carcass if the ratio of colored pixels within the specified color range is less than the threshold value.

13. The method of claim 12, further comprising:

saving the image associated with the marked animal carcass to a memory unit.

14. The method of claim 9, wherein the processing unit removes the animal carcass from a first section of the transport system onto a second section of the transport system.

15. The method of claim 12, wherein the ink detection model is designed to identify a color value, wherein the specified color range corresponds to the color value.

16. The method of claim 9 further comprising:

generating a notification using a notification system, wherein the notification can include an output of the ink detection model.

17. An ink detection system designed to detect ink on an animal carcass comprising:

a transport system designed to move the animal carcass;

a data capture device designed to capture one or more images of the animal carcass as it moves on the transport system;

an ink detection model including at least one processor and a memory unit with programmable instructions that when executed cause the at least one processor to:

receive an image of the one or more images received from the data capture device;

process the image of the animal carcass and isolate a plurality of pixels of the image that are within a specified color range associated with the ink being detected;

determine an objective evaluation of the animal carcass by identifying a presence or absence of the ink on the animal carcass if a ratio of colored pixels within the specified color range is greater than a threshold value associated with the ink being detected; and activate a microcontroller to initiate an ejection device when the presence of the ink is identified on the animal carcass.

18. The system of claim 17, wherein processing the image of the animal carcass includes the ink detection model causing the processor to further:

convert the image to a color format; and isolate a plurality of pixels of the image by creating a mask of any pixel value that is between an upper color format value and a lower color format value selected as a specified color range and applying the mask over the image.

19. The system of claim 17, wherein the ejection device removes the animal carcass from a first section of the transport system onto a second section of the transport system.

20. The system of claim 18, wherein the ink detection model is designed to identify a color value, wherein the specified color range corresponds to the color value.

* * * * *